United States Patent
Yamagishi (10) Patent No.: US 8,296,799 B2
(45) Date of Patent: Oct. 23, 2012

(54) BROADCAST PROGRAM AND DIGEST VIEW DISPLAY APPARATUS AND METHOD

(75) Inventor: Toru Yamagishi, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 496 days.

(21) Appl. No.: 12/586,269

(22) Filed: Sep. 21, 2009

(65) Prior Publication Data

US 2010/0088724 A1 Apr. 8, 2010

(30) Foreign Application Priority Data

Oct. 7, 2008 (JP) ................................. 2008-260232

(51) Int. Cl.
*G06F 3/00* (2006.01)
*G06F 13/00* (2006.01)
*H04N 5/445* (2006.01)
*H04N 5/76* (2006.01)

(52) U.S. Cl. ............... 725/41; 725/42; 725/43; 725/61; 348/564; 386/297

(58) Field of Classification Search .................... 725/41, 725/42, 43, 61; 348/564; 386/297
See application file for complete search history.

(56) References Cited

U.S. PATENT DOCUMENTS

| | | | | |
|---|---|---|---|---|
| 6,147,714 A | * | 11/2000 | Terasawa et al. | 348/564 |
| 2002/0178450 A1 | * | 11/2002 | Morita et al. | 725/61 |
| 2005/0259963 A1 | * | 11/2005 | Sano et al. | 386/83 |
| 2006/0107289 A1 | * | 5/2006 | DeYonker et al. | 725/37 |
| 2007/0183743 A1 | * | 8/2007 | Tanikawa et al. | 386/83 |
| 2007/0245382 A1 | * | 10/2007 | Doi et al. | 725/55 |

FOREIGN PATENT DOCUMENTS

| | | |
|---|---|---|
| JP | 2003-169312 | 6/2003 |
| JP | 2007/534218 | 11/2007 |
| JP | 2008-099237 | 4/2008 |
| JP | 2008-154206 | 7/2008 |

* cited by examiner

*Primary Examiner* — Hoang-Vu A Nguyen-Ba
(74) *Attorney, Agent, or Firm* — Renner, Kenner, Greive, Bobak, Taylor & Weber (57) ABSTRACT

Received by a program display apparatus are: programs for each of which a receiving time has been determined; digest views corresponding to the programs; and receiving-time information for the programs. The received digest views and receiving-time information are stored in a memory. A moving picture is displayed on a main screen zone of a monitor screen, with the digest views that have been stored in the memory on a sub screen zone of the monitor screen, as being superposed on the moving picture, according to the user's operation. Each digest view is allowed to be displayed on the sub screen zone when a remaining time of the program corresponding the digest view, obtained based on the receiving-time information, is longer than the reference time. The digest view is, however, inhibited from being displayed on the sub screen zone when the remaining time is equal to or shorter than the reference time.

21 Claims, 6 Drawing Sheets

BROADCAST PROGRAM AND DIGEST VIEW DISPLAY APPARATUS AND METHOD

CROSS-REFERENCE TO RELATED APPLICATIONS

This application is based on and claims the benefit of priority from the prior Japanese Patent Application No. 2008-260232 filed on Oct. 7, 2008, the entire contents of which is incorporated herein by reference.

BACKGROUND OF THE INVENTION

The present invention relates to a broadcast program display apparatus and a broadcast program display method for displaying a broadcast program and digest views of other broadcast programs as superposed on the displayed broadcast program.

In viewing a television broadcast program (referred to as a program, hereinafter), users generally refer to the TV program guide of a news paper or an electronic program guide (referred to as an EPG, hereinafter).

An EPG is a convenient tool for users because it allows users to: use a key word according to their preference to pick up a particular program that includes the key word; and record a program or make viewing reservation so that users will not miss a chance of viewing their favorite programs.

However, users sometimes cannot know the contents of a program by just referring to the title of the program on the EPG.

In order to solve such a problem, there is a technique to display digest views for programs on an EPG so that users can select a program based on the digest views.

With such a known technique, users can quickly find out their favorite programs. However, the known technique still has problems in that digest views are continuously displayed on an EPG even if the remaining time of a program is very short when he or she refers to its digest view or the program has already been finished, due to no time management being applied to the digest views. Thus, it could happen that a program is almost finished or has already been finished when users select the program by referring to the digest views, which makes them disappointed.

SUMMARY OF THE INVENTION

A purpose of the present invention is to provide a broadcast program display apparatus and a broadcast program display method for controlling the timing of displaying digest views to display particular digest views only for the programs valuable for users to watch in view of the program remaining time, thus achieving a higher level of user satisfaction.

The present invention provides a program display apparatus comprising: a program receiver to receive programs for each of which a receiving time has been determined; a digest receiver to receive digest views corresponding to the programs and receiving-time information for the programs; a memory to store the received digest views and receiving-time information; a displayer to display a moving picture on a main screen zone of a monitor screen and the digest views that have been stored in the memory on a sub screen zone of the monitor screen, as being superposed on the moving picture; and a display limiter to allow each digest view to be displayed on the sub screen zone when a remaining time of the program corresponding the digest view, obtained based on the receiving-time information, is longer than a reference time, whereas inhibit the digest view from being displayed on the sub screen zone when the remaining time is equal to or shorter than the reference time.

Moreover, the present invention provides a program display method comprising the steps of: receiving programs for each of which a receiving time has been determined; receiving digest views corresponding to the programs and receiving-time information for the programs; storing the received digest views and receiving-time information in a memory; displaying a moving picture on a main screen zone of a monitor screen and the digest views that have been stored in the memory on a sub screen zone of the monitor screen, as being superposed on the moving picture; and allowing each digest view to be displayed on the sub screen zone when a remaining time of the program corresponding the digest view, obtained based on the receiving-time information, is longer than a reference time whereas inhibiting the digest view from being displayed on the sub screen zone when the remaining time is equal to or shorter than the reference time.

DETAILED DESCRIPTION OF PREFERRED EMBODIMENTS

Preferred embodiments according to the present invention will be disclosed with reference to the drawings attached herewith.

Figure 1:
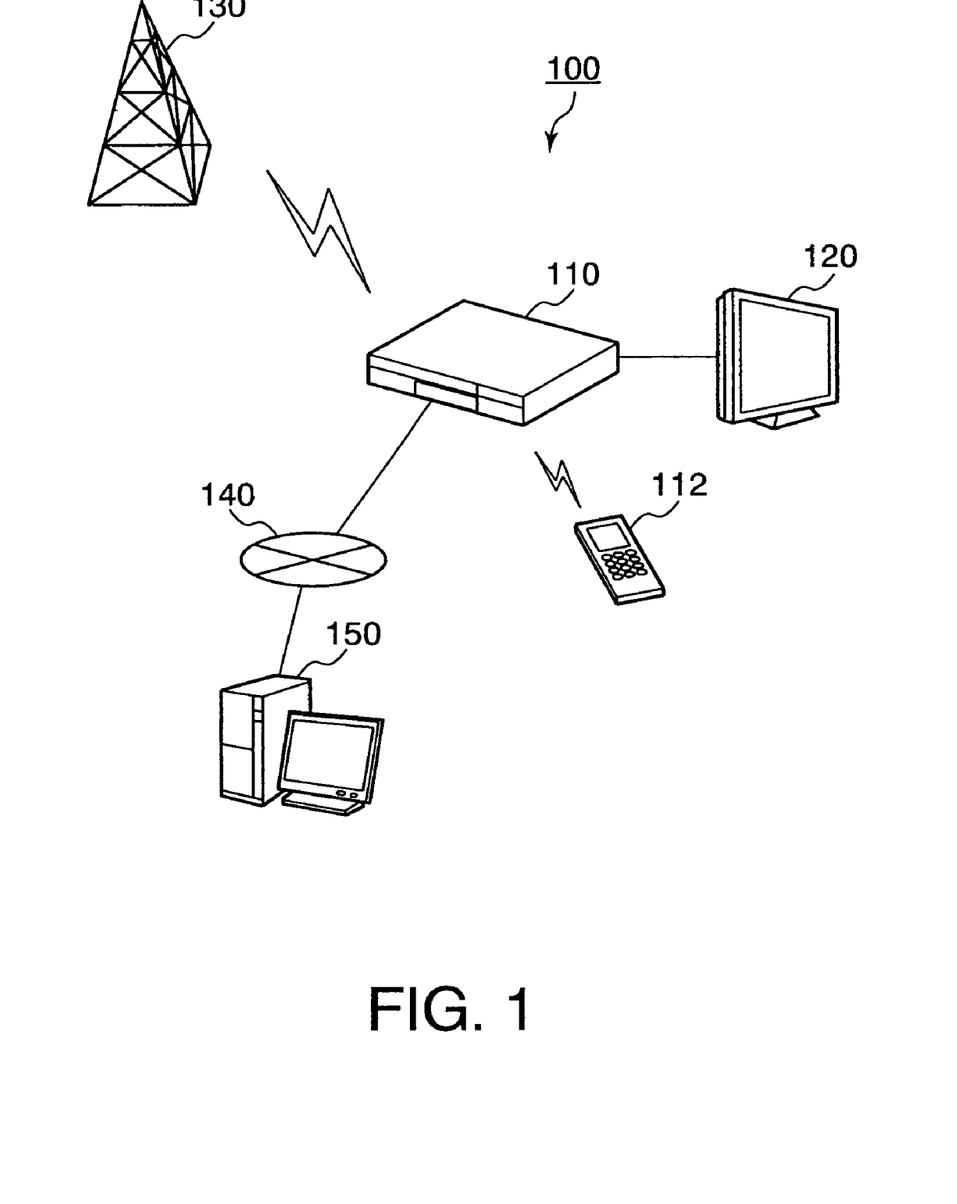
FIG. 1 shows an overall configuration of a broadcast program display system, according to the present invention.

FIG. 1 illustrates an overall configuration of a broadcast program display system 100.

The broadcast program display system 100 includes a broadcast program display apparatus 110, a remote controller 112, a monitor screen 120, a broadcast station 130, a communication network 140 with Internet, ISDN (Integrated Services Digital Network) lines, dedicated lines, etc., and a program management server 150 connected to the communication network 140.

The broadcast program display apparatus 110 receives a broadcast wave from the broadcast station 130 and displays a program selected among the programs carried by the broadcast wave on the monitor screen 120. Moreover, the apparatus 110 acquires an EPG and other information from the broadcast wave transmitted from the broadcast station 130 or downloads them through the communication network 140 and displays them on the monitor screen 120 for users to find out their favorite programs.

Moreover, the broadcast program display apparatus 110 displays digest views for several viewable programs on the monitor screen 120. The digest views may be displayed alone or in addition to the EPG on the screen 120. A digest view is a combination of still or moving picture clips with/without audio, that shows the summary of the contents of a program.

Users are allowed to operate the broadcast program display apparatus 110 directly or through the remote controller 112.

In this embodiment of the present invention, the display timing of the digest views is controlled by the broadcast program display apparatus 110 so that digest views only for the programs valuable for each user to watch in view of the program remaining time can be displayed, thus achieving a higher level of user satisfaction.

The broadcast program display apparatus 110 will be described in detail with respect to a block diagram shown in FIG. 2.

The broadcast program display apparatus 110 includes a program receiver 210, an antenna 212, a descrambler 214, a demultiplexer 216, a demultiplexer RAM 218, a video decoder 220, an audio decoder 222, a graphics unit 224, an audio output unit 226, a CPU 228, a bus 230, a ROM 232, a RAM 234, a flash memory 236, an RTC (Real Time Clock) 238, a remote control I/F (interface) 240, and a communication I/F (interface) 242.

The program receiver 210 is, for example a tuner, which receives digital broadcast waves from broadcast stations, such as the broadcast station 130, through the antenna 212. The receiver 210 selects a channel from the digital broadcast waves, under control by the CPU 228, in response to user's operations of the remote controller 112.

Moreover, the program receiver 210 extracts programs from the selected channel. The programs to be selected are those for which at least the receiving time is predetermined. One example of the programs to be selected is a moving picture program. Another example is a program from streaming for which the receiving time or the term for receiving is predetermined, such as viewable by the end of this month.

Such programs may be received via a cable television, wire broadband, etc., in addition to broadcast waves.

The descrambler 214 descrambles a signal output from the program receiver 210 if the signal has been scrambled. The signal is scrambled mainly for billing users. The descrambler 214 then descrambles the signal only for the users who have paid for viewing or recording the program carried by the scrambled signal and returns the signal into a viewable condition.

The demultiplexer 216 separates data output from the descrambler 214 into video data, audio data, SI/PSI (Service Information/Program Specific Information), and data carousel information.

The video and audio data are supplied to the video decoder 220 and the audio decoder 222, respectively. The SI/PSI and data carousel information are stored in the demultiplexer RAM 218 and then stored in the RAM 234 after processed by the CPU 228. The processing at the CPU 228 includes conversion of the SI/PSI for an EPG display and extraction of BML (Broadcast Markup Language) text from the data carousel information.

The video decoder 220 decodes compressed video data from the demultiplexer 216. The decoded video data is superposed with GUI images at the graphics unit 224 and then output to the monitor screen 120, as video output.

When a user operates the remote controller 112 for the EPG, its signal is received by the graphics unit 224 via the remote control I/F 240, the CPU 228 retrieves the EPG prestored in the RAM 234, the graphics unit 224 superposes the EPG on the moving picture and displays it on the monitor screen 120.

The EPG contains information for, for example, eight days from today, which includes information on programs, such as, the broadcast station 130 and other broadcast stations that will broadcast programs, a starting time, a duration, and a title of each program. Receiving-time information to be used in this embodiment according to the present invention includes the starting time and the ending time that is calculated from the starting time and the duration.

The audio decoder 222 decodes compressed audio data from the demultiplexer 216. The audio decoder 222 and the video decoder 220 can also retrieve audio and video data, respectively, from the ROM 232 or RAM 234. The decoded audio data is then output to a speaker 160 via the audio output unit 226, as audio output.

The CPU 228 controls the program receiver 210, the descrambler 214, the demultiplexer 216, the video decoder 220, the audio decoder 222, the graphics unit 224, and the audio output unit 226, through the bus 230.

The CPU 228 is also connected to the ROM 232, the RAM 234, the flash memory 236, the RTC 238, the remote control I/F 240, and the communication I/F 242, through the bus 230.

The ROM 232 stores programs to be executed by the CPU 228. The RAM 234 stores variables to be used when the programs run on the CPU 228. Moreover, in this embodiment, the RAM 234 also functions as a memory to store digest views received by the communication I/F 242 and the receiving-time information on the programs corresponding to the digest views. The flash memory 236 is a non-volatile memory so that it can keep data even if power is off. Thus, the digest views and the information stored in the RAM 234 can be sent to the flash memory 236 for retention. The flash memory 236 may be replaced with an HDD.

The RTC 238, powered by an internal battery, measures time to be referred to by the CPU 228 and shows the current time. The RTC 238 has four options: (1) being equipped with a crystal oscillator to measure time by itself; (2) storing extracted time information TOT (Time Offset Table) from SI transmitted as being carried by a broadcast wave, to keep time; (3) keeping time given from the Internet via the communication I/F 242; and (4) a combination of any of the above options.

The remote control I/F 240 receives infrared rays from the remote controller 112 to receive a command corresponding to a user input to the controller 112. The command is then sent to the CPU 228 for executing a procedure corresponding to the command.

The communication I/F 242 can be connected to a variety of servers, such as the program management server 150, via the communication network 140, with the communication protocols, such as, TCP (Transmission Control Protocol)/IP (Internet Protocol), to receive an EPG carrying information on programs. Moreover, in this embodiment, the communication I/F 242 functions as a digest receiver to receive digest views and receiving-time information. The EPG, digest views and receiving-time information may, however, be supplied by broadcast waves. The communication I/F 242 may further receive programs themselves.

In addition to control of the several components included in the broadcast program display apparatus 110, the CPU 228 functions as a video displayer 250, a display limiter 252, an information noticer 254, and a program selector 256, while co-operating with other components, such as the RAM 234.

Figure 3:
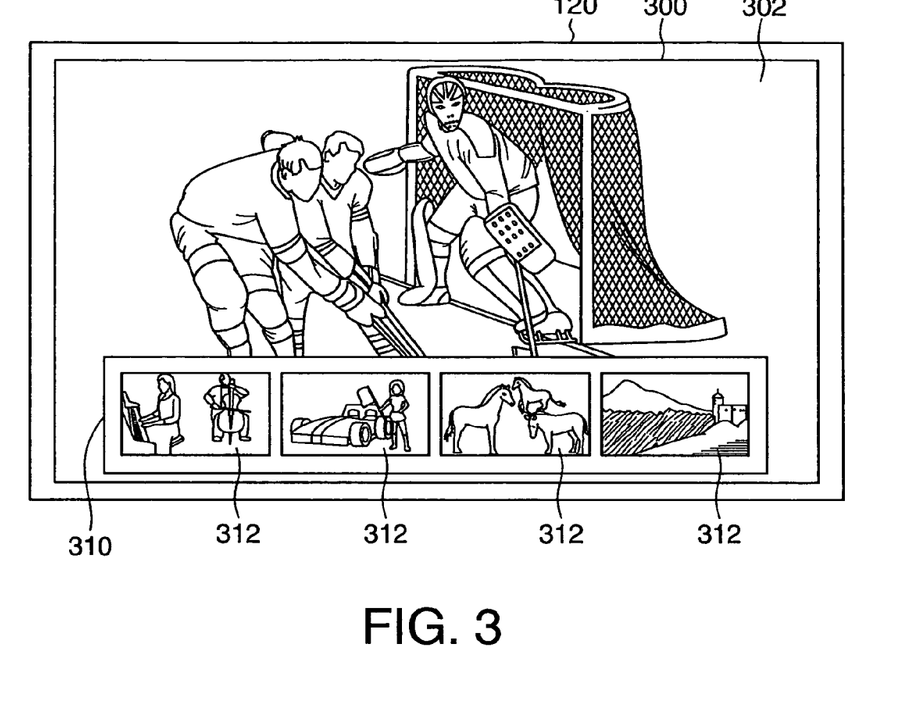
FIG. 3 shows an exemplary view to be displayed on a monitor screen by a video displayer of the broadcast program display apparatus, according to the present invention.

Illustrated in FIG. 3 is an exemplary view to be displayed, by the video displayer 250, on the monitor screen 120.

The video displayer 250 displays a moving picture 302 (for example, a program broadcast at present) and digest views 312 stored in the RAM 234 (or the flash memory 236) on a main screen zone 300 and a sub screen zone 310 (as being superposed on the main screen zone 300), respectively, of the monitor screen 120.

Each of the four digest views 312 shown in FIG. 3 is a moving picture. Optionally, some of them might be a still picture. Moreover, the digest views 312 may be replaced with a text image indicating a title of the program, the broadcast station name, etc., with digest audio.

Figure 4:
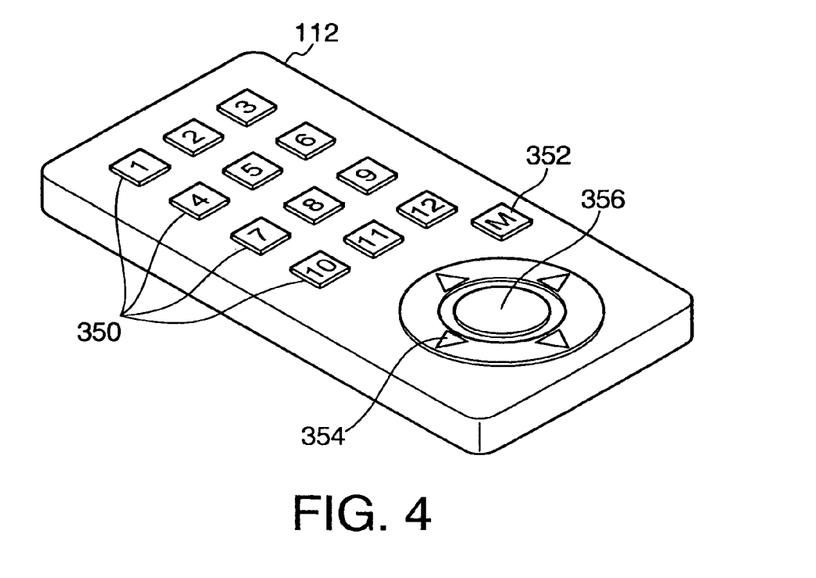
FIG. 4 shows a perspective view of the appearance of a remote controller.

FIG. 4 shows a perspective view of the appearance of the remote controller 112.

The remote controller 112 is equipped with number keypads 350 (so-called "ten key"), a sub-screen-zone display keypad 352, a 4-way cross keypad 354, and an enter keypad 356.

Figure 5:
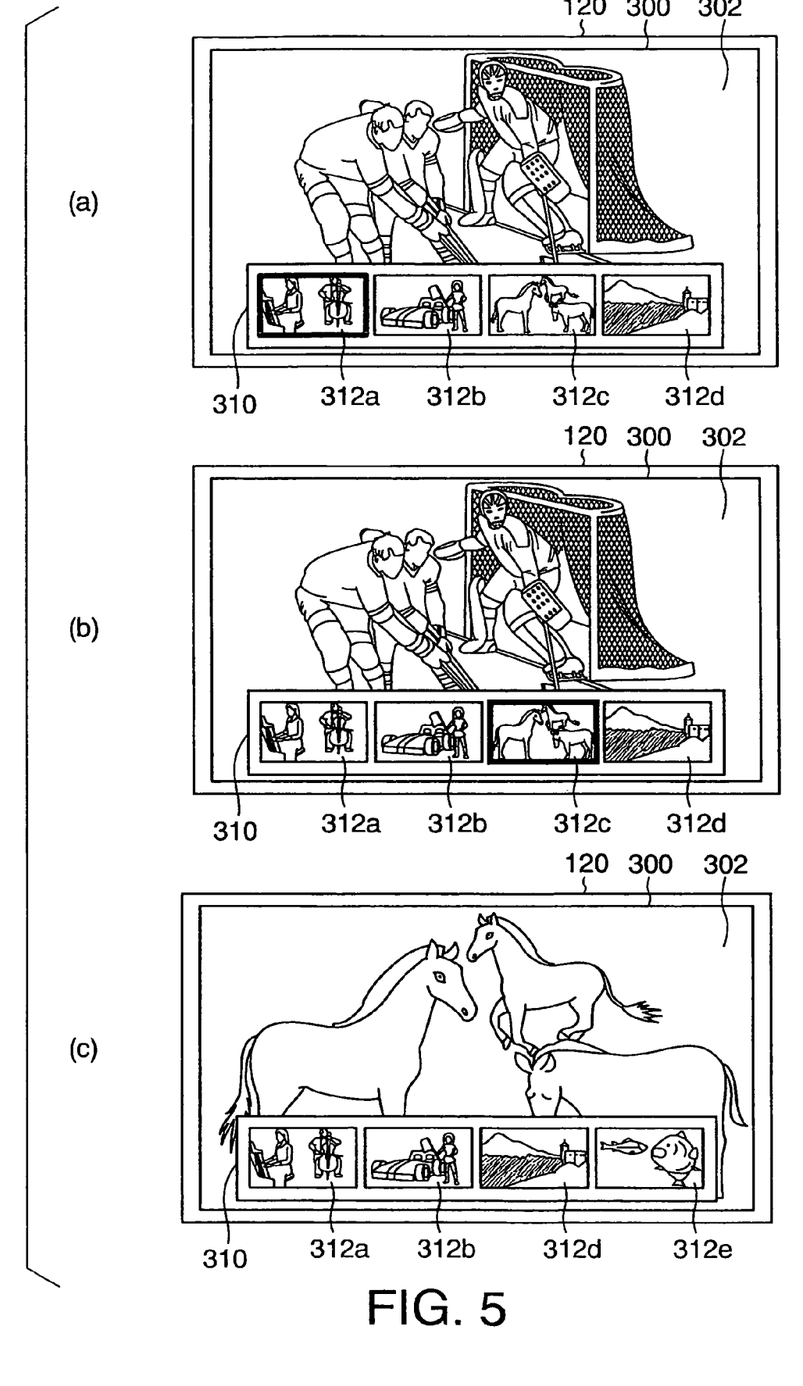
FIG. 5 shows several exemplary views to be displayed on the monitor screen by user operations of the remote controller with GUI (Graphical User Interface) functions, according to the present invention.

Illustrated in FIG. 5 are exemplary views to be displayed on the monitor screen 120 by user operations of the remote controller 112 with GUI (Graphical User Interface) functions.

When a user presses the number keypads 350, a moving picture, he or she wants to watch, such as the moving picture 302, is displayed on the main screen zone 300 of the monitor screen 120, as shown in FIG. 3. This state is referred to as an on-air sub mode.

Moreover, when the user presses the sub-screen-zone display keypad 352, the sub screen zone 310 becomes active and is displayed on the monitor screen 120, as being superposed on the main screen zone 300. This state is referred to as a digest mode. In the digest mode, although the sub screen zone 310 is being displayed, it becomes just viewable with no sounds, or the sounds given by the audio output unit 226 via the speaker 160 are those for the moving picture 302 of the main screen zone 300.

Views displayed on the sub screen zone 310 are several digest views, for example, four digest views 312a, 312b, 312c and 312d, as shown in FIG. 3. These are programs broadcast from, for example, four broadcast stations, such as the broadcast station 130.

The data of the digest views 312a, 312b, 312c and 312d have been stored in the RAM 234 (or the flash memory 236). The video data stored in the RAM 234 are decoded by the video displayer 250 with a decoding program and converted into the digest views 312a, 312b, 312c and 312d. Each digest view is then displayed on the sub screen zone 310 for each frame, via the graphics unit 224. All or some of the digest-view data decoding may be performed by a decoder that is a dedicated hardware, such as the video decoder 220, for this decoding.

The video displayer 250 may have the following functions: displaying a title, a starting time, an ending time, a broadcasting station on the monitor screen 120, etc., as being superposed on each digest view 312; displaying a digest view 312 of a program selected based on a keyword entered by a user via the remote controller 112; and displaying digest views 312 of several programs which will be broadcast by a particular broadcasting station.

Several known techniques can be used for displaying digest views, concerning the type of digest views.

When the user presses the enter keypad 356 of the remote controller 112, upon the sub screen zone 310 is displayed like shown in FIG. 3, the digest view 312a becomes focused, with its border color highlighted like shown in (a) of FIG. 5. Such border coloring may be replaced with a symbol appearing on the view or coloring the view itself.

The term "focus" is used to define the situation in which a digest view is selected by a user, in the present invention.

While the digest view 312a is being focused, the audio output unit 226 outputs the sounds corresponding to the focused view 312a through the speaker 160 instead of the sounds corresponding to moving pictures that are being displayed on the main screen zone 300. The video and audio mechanism allows a user to know the contents of a focused digest view with a help of the sounds corresponding to the focused view even though the main screen zone 300 is active as being displayed.

A focused digest view can be shifted to another view, such as the digest view 312c, as shown in (b) of FIG. 5, through a user operation of the 4-way cross keypad 354 of the remote controller 112, when he or she finds out a specific program while watching the digest views 312a, 312b, 312c, and 312d.

When a focused digest view is shifted to another one, such as the digest view 312c, the sounds output by the audio output unit 226 is switched in accordance with the digest-view shifting. Then, when a user presses the enter keypad 356 of the remote controller 112 again to decide the focused (selected) digest view 312c as a program-determination view for use in final determination of a program to be displayed on the main screen zone 300, the program corresponding to the view 312c is displayed on the zone 300, as shown in (c) of FIG. 5, by the program selector 256, instead of the moving picture 302 of the currently broadcast program.

With this view switching on the main screen zone 300, a digest view 312e is displayed instead of the digest view 312c, also as shown in (c) of FIG. 5. What view comes as the digest view 312e depends on each view switching on the main screen zone 300.

In the digest-view shifting, when shifting is continued by the 4-way cross keypad 354 in a direction, for example, right in the sub screen zone 310, other digest views not displayed at first can be displayed as the views being shifted in the left direction.

As one of the functions of the 4-way cross keypad 354, the up and down keypads can be used for shifting digest views by day, which are received at the same receiving time. In detail, when the up keypad is pressed once, a view displayed is a digest view of the day subsequent to the day of the currently displayed digest view at the same receiving time. And, when the down keypad is pressed once, a view displayed is a digest view of the day previous to the day of the currently displayed digest view at the same receiving time.

Described next are several functions of the display limiter 252 of the CPU 228, which is one of the features of the present invention.

The display limiter 252 retrieves receiving-time information for a program from the RAM 234 and calculates a remaining time of the program based on the receiving time. Then, the display limiter 252 compares the remaining time with a reference time to determine whether the former is longer than the latter. If it is determined that the remaining time is longer than the reference time, the display limiter 252 allows a digest view 312 of the program to be displayed on the monitor screen 120. However, if it is determined that the remaining time is equal to or shorter than the reference time, the display limiter 252 inhibits the digest view 312 of the program from being displayed or deletes the view 312 from the sub screen zone 310 if already displayed.

The reference time may be a fixed time. Or, it might be 5 minutes, 30 minutes, etc., set by a user. Moreover, the reference time may be changed depending on a program duration. The reference time set at, for example, 25% of a program duration, allows no digest views 312 to be displayed for a 2-hour program when the remaining time of the program is 30 minutes or shorter.

As described above, in displaying digest views 312 on the sub screen zone 310, no digest view 312 is displayed if the remaining time of the program corresponding to this view 312 is equal to or shorter than a predetermined time. This digest-view display control mechanism allows digest views 312 to be displayed only for the programs valuable for users to watch in view of the remaining time and guarantees that the programs for which digest views 312 are being displayed are viewable at least for a certain time, thus achieving a higher level of user satisfaction.

When the display limiter 252 inhibits or halts display of any digest view 312 on the sub screen zone 310, the information noticer 254 notices users about it via the monitor screen 120 or the speaker 160. This notice mechanism allows users to know the deletion of digest views 312 from the sub screen zone 310 and the change in selectable programs.

Moreover, as described with respect to FIG. 5, when any of the digest views 312 is being focused, instead of the sounds corresponding to the moving picture 302 of the currently broadcast program, the sounds corresponding to the focused view 312 is output, through user operations of the remote controller 112. However, when the display limiter 252 deletes the focused digest view 312 from the sub screen zone 310, the limiter 252 returns the focus to the moving picture 302 to the main screen zone 300, with the sounds returning to those corresponding to the moving picture 302. This view switching mechanism achieves seamless view focusing.

Another option is that, when the display limiter 252 deletes the focused digest view 312, the limiter 252 may shift focus to another digest view 312 and display the newly focused view 312 on the main screen zone 300, with the sounds corresponding to the newly focused view 312 from the audio output unit 226. The newly focused view under the focus shifting function may be a digest view adjacent to the currently focused digest view, the top digest view, the last digest view, or any of the digest views.

When the display limiter 252 deletes the focused digest view 312, the audio output unit 226 loses a target for which the unit 226 outputs sounds. In order to solve this problem, when the focused digest view 312 is deleted from the sub screen zone 310, the display limiter 252 shifts focus to another digest view 312 and switches the sounds to the newly focused view 312. This sound switching mechanism achieves seamless focus shift while allows users to continuously watch the digest views on the sub screen zone 310 and listen to the sounds corresponding to these views on the zone 310.

Described next in detail is the digest-view deletion timing at the display limiter 252.

The display limiter 252 has several functional options concerning the digest-view deletion timing. One requirement through the functional options is the time comparison in which the display limiter 252 compares the reference time and the remaining time of the program corresponding to a digest view 312 to determine whether the remaining time is equal to or shorter than the reference time.

As a first option, the display limiter 252 may perform the time comparison at the moment of the shift from the on-air sub mode to the digest mode to display the digest view 312 on the sub screen zone 310 that is superposed on the main screen zone 300, by the video displayer 250.

When a user selects a program through the digest views 312, it is highly likely that he or she selects a certain program just after that the digest views 312 are displayed on the sub screen zone 310 by the video displayer 250. Therefore, the time comparison at the moment of the shift from the on-air sub mode to the digest mode requires less processing load while achieving the purpose of the invention.

As a second option, the display limiter 252 may perform the time comparison at the moment of every completion of reproduction of a digest view 312 that is a moving picture having a certain duration and repeatedly reproduced and displayed.

Figure 6:
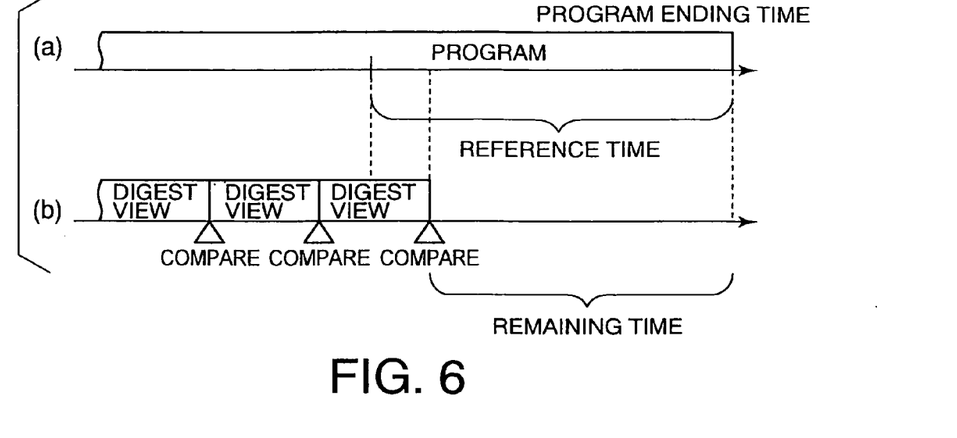
FIG. 6 shows a timing chart showing a program and several digest views corresponding to the program, displayed at a specific timing, according to the present invention.

Shown in FIG. 6 is a timing chart, showing a program and a digest view 312 repeatedly displayed at a specific timing, for explaining the second option of the display limiter 252. Shown in (a) of FIG. 6 is a certain program to be identified by the digest view 312. Shown in (b) of FIG. 6 is the digest view 312 repeatedly displayed.

Illustrated in FIG. 6 is that the time comparison is performed at the moment of every completion of repeated reproduction of the digest view 312 and then the view 312 is deleted from the sub screen zone 310 if the remaining time is equal to or shorter than the reference time whenever each repeated reproduction finishes.

The digest-view deletion illustrated in FIG. 6 allows users to watch the moving picture of the digest view 312 until the view 312 disappears, thus achieving a higher level of user satisfaction.

As a third option, the display limiter 252 may intermittently calculate a remaining time of a program corresponding to a repeatedly displayed digest view 312 and inhibit display of the view 312 on the sub screen zone 310 whenever it is determined that the calculated remaining time becomes equal to or shorter than the reference time.

Figure 7:
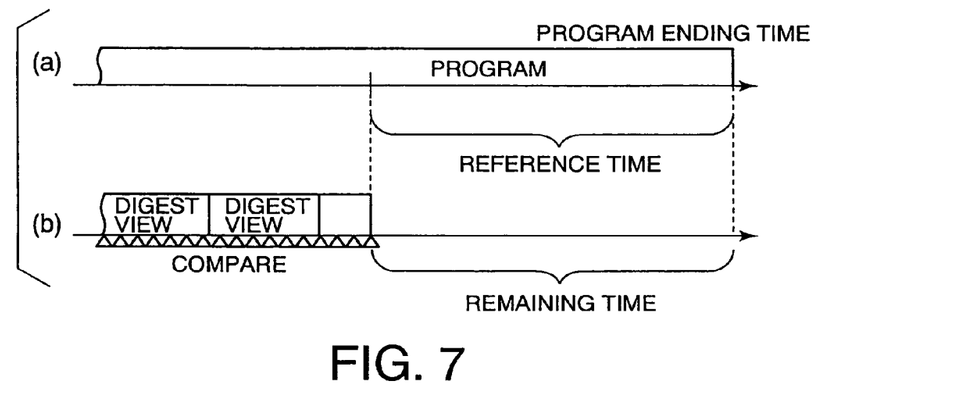
FIG. 7 shows another timing chart showing a program and several digest views corresponding to the program, displayed at a specific timing, according to the present invention.

Shown in FIG. 7 is a timing chart, showing a program and a digest view 312 repeatedly displayed at a specific timing, for explaining the third option of the display limiter 252. Shown in (a) of FIG. 7 is a certain program to be identified by means of the digest view 312. Shown in (b) of FIG. 7 is the digest view 312 repeatedly displayed.

Illustrated in FIG. 7 is that the digest view 312 is deleted from the sub screen zone 310 immediately when the remaining time is determined as being equal to or shorter than the reference time during the intermittent calculation of the remaining time and comparison.

The digest-view deletion illustrated in FIG. 7 achieves real-time deletion of digest views so that users can change programs quickly.

Moreover, as a fourth option, the display limiter 252 may: intermittently perform the time comparison when a digest view 312 is a moving picture and while the view 312 is being repeatedly reproduced and displayed; and allow the digest view 312 to be displayed until the view 312 finishes in each reproduction even if the remaining time is equal to or shorter than the reference time.

Figure 8:
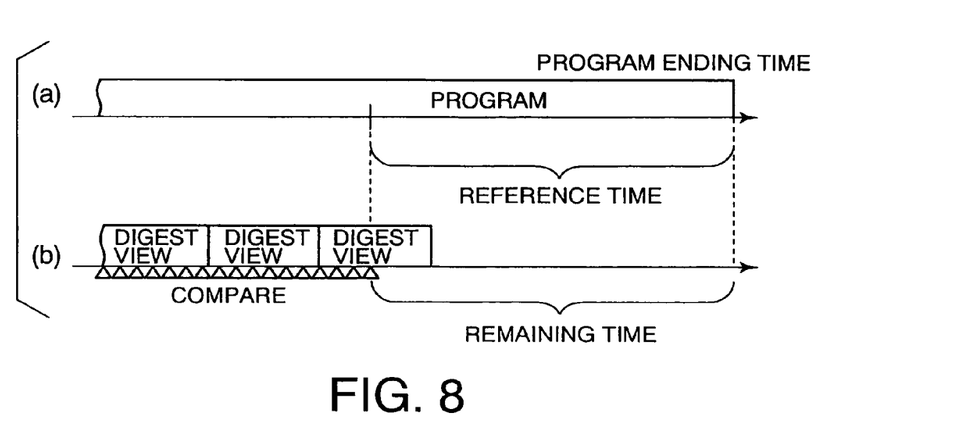
FIG. 8 shows still another timing chart showing a program and several digest views corresponding to the program, displayed at a specific timing, according to the present invention.

Shown in FIG. 8 is a timing chart, showing a program and the digest view 312 repeatedly displayed at a specific timing, for explaining the fourth option of the display limiter 252. Shown in (a) of FIG. 8 is a certain program to be identified by means of the digest view 312. Shown in (b) of FIG. 8 is the digest view 312 repeatedly displayed.

Illustrated in FIG. 8 is that that the current digest view 312 is decided to be deleted from the sub screen zone 310 immediately when the remaining time of the program is determined as being equal to or shorter than the reference time during the intermittent calculation of the remaining time; however, when the current digest view 312 is a moving picture having a certain duration that is shorter than the reference time, the current digest view 312 is allowed to be displayed as far as the current repetition is performed whereas the succeeding digest view 312 is inhibited from being displayed.

When the digest view is suddenly disappeared in the third option for digest-view real-time deletion, it could disappoint users who want to watch at least the digest view, or the program corresponding to this view even if the program remaining time is short.

On the contrary, the fourth option illustrated in FIG. 8, a modification to the third option, allows a moving picture of the current digest view 321 to be displayed until this view 321 finishes, thus meeting the demands of users who want to watch a program even if the remaining time of the program is equal to or shorter than the reference time.

Described next are several functions of the program selector 256 that is one of the features of the present invention.

As described with respect to FIG. 5, when one of the digest views 312 is selected and displayed on the sub screen zone 310 through user operations of the remote controller 112, the program selector 256 displays the selected digest view 312 on the main screen zone 300 of the monitor screen 120, instead of the moving pictures of the currently broadcast program.

Moreover, when one of the digest views 312 is focused through user operations of the remote controller 112, the program selector 256 may display a supplemental digest view on the sub screen zone 310 instead of the focused digest view 312. The supplemental digest view is a prepared view that has different contents from the focused digest view 312, with a larger data amount than the focused view 312, for example.

The focused digest view 312*a* in (a) of FIG. 5 or the focused digest view 312*c* in (b) of FIG. 5 may, for example, be replaced with the supplemental digest view. The digest view 312*a* or 312*c* appears again when the focus is shifted and the supplemental digest view finishes.

The supplemental digest view is, for example, a longer version of a digest view 312, with a longer duration than the digest view 312 but shorter than the corresponding program. When a digest view 312 lasts for, for example, 15 seconds, the supplemental digest view may last for 1 minutes, 5 minutes, etc.

The digest view 312 and its supplemental digest view are both edited with any scenes of the corresponding program. However, both views may or may not be edited as including the same scenes.

Figure 2:
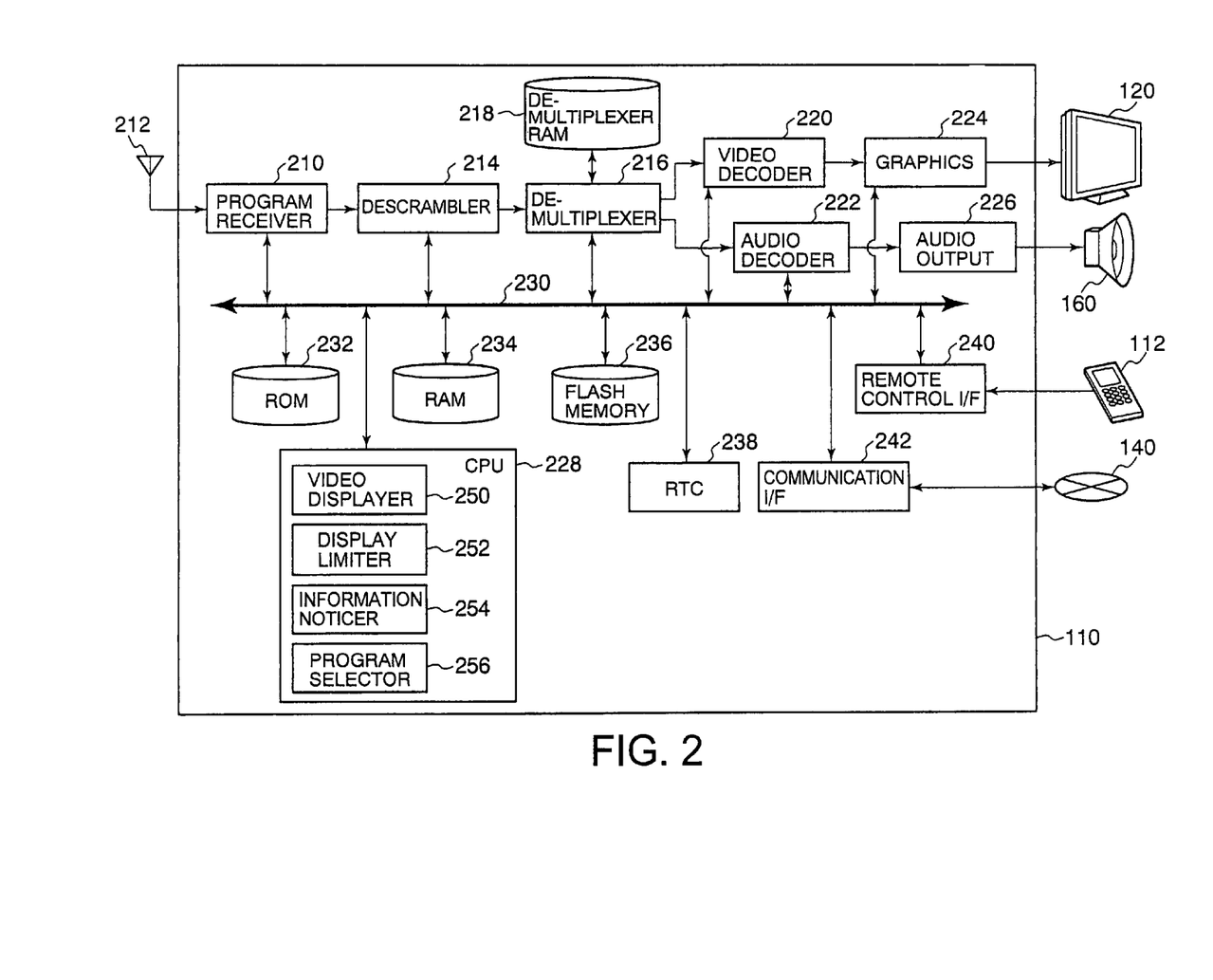
FIG. 2 shows a block diagram of a broadcast program display apparatus, according to the present invention.

The digest view 312 and its supplemental digest view may be supplied from the same source, such as, the program management server 150, or dedicated servers (not shown in FIGS. 1 and 2).

In FIG. 5, the digest views 312 are displayed before the corresponding supplemental digest views even if both of the digest views and the supplemental digest views are supplied at the same time.

As described above, in detail, the user can watch the digest views even he or she does not focus on a particular digest view. Moreover, users can watch a supplemental digest view carrying a moving picture of a long duration, with easy operations, when he or she focuses on a particular digest view, thus enjoying efficient program selection.

Figure 9:
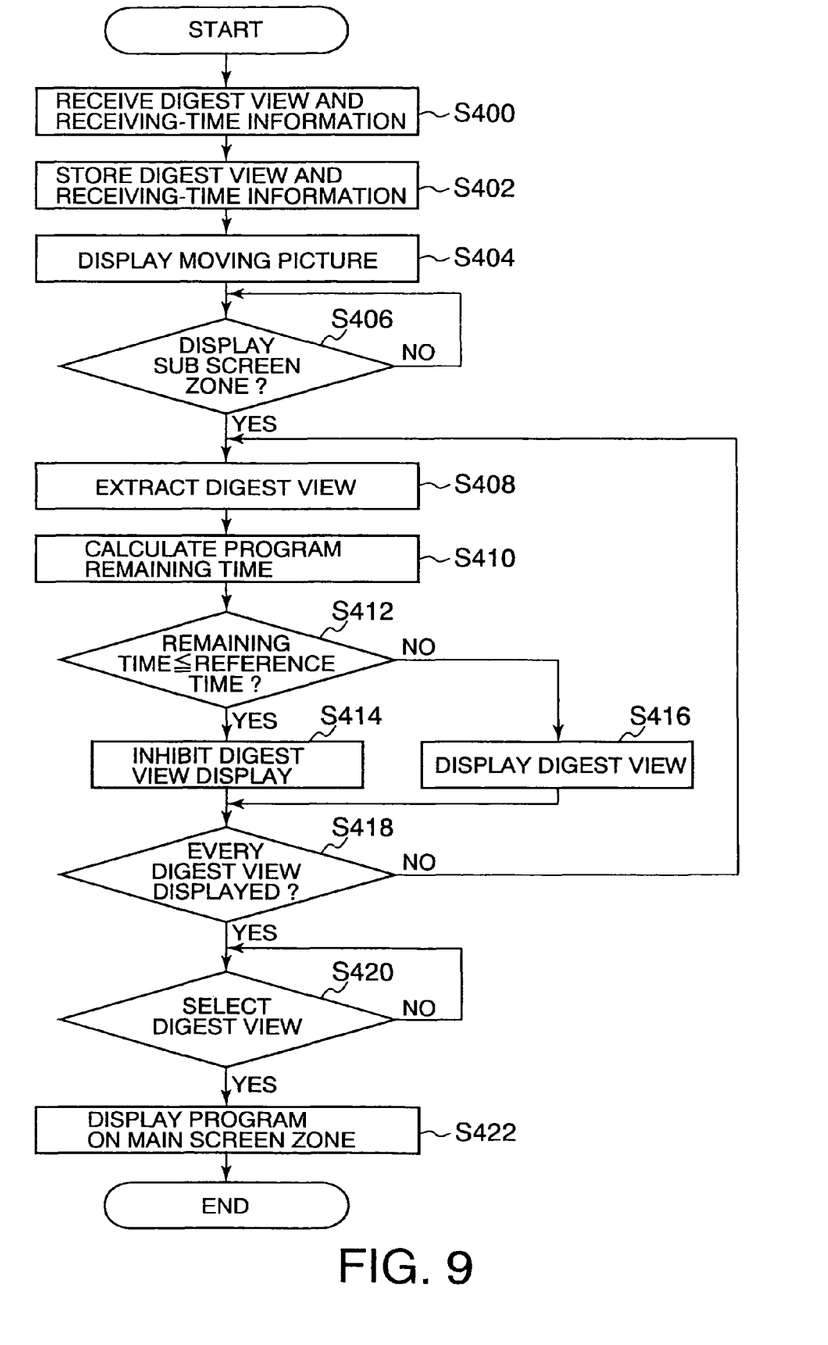
FIG. 9 shows a flowchart for a method of displaying digest views, according to the present invention.

Described next with reference to a flowchart shown in FIG. 9 is a method of displaying the digest views by the broadcast program display apparatus 110 (FIG. 2).

Received first are digest views 312 of programs, each to be received at a predetermined time, and receiving-time information for the programs to be identified by the digest views 312, via the program receiver 210 or the communication I/F 242, in step S400. The digest views 312 and the receiving-time information are then stored in the RAM 234, in step S402.

A moving picture 302 (for example, a program broadcast at present) is selected by a user and displayed on the monitor screen 120, in step S404.

It is determined in step S406 whether the user is operating the remote controller 112 to press the sub-screen-zone display keypad 352 so that the sub screen zone 310 becomes active to be displayed as being superposed on the main screen zone 300 while he or she is watching a moving picture 302 on the main screen zone 300.

When it is determined that the user is operating the remote controller 112 to activate the sub screen zone 310 (YES in step S406), the display limiter 252 determines, as described below, whether to allow each digest views 312 to be displayed or inhibit them from being displayed when the displayer 250 displays them on the sub screen zone 310 (the digest-view display permission determination procedure).

In detail, the display limiter 252 extracts one of the digest views 312, in step S408, and calculates the remaining time of the program corresponding to the extracted digest view, in step S410.

Then, the display limiter 252 compares the calculated remaining time with the reference time to determine whether the former is equal to or shorter than the latter, in step S412.

When it is determined that the calculated remaining time is equal to or shorter than the reference time (YES in step S412), the display limiter 252 inhibits the digest view 312 (extracted in step S408) from being displayed, in step S414.

On the contrary, when it is determined that the calculated remaining time is longer than the reference time (NO in step S412), the display limiter 252 allows the digest view 312 (extracted in step S408) to be displayed, in step S416.

Then, it is determined in step S418 whether there is another digest view 312 to be displayed, or more rooms in the sub screen zone 310 to display another digest view (four rooms being shown in FIG. 3).

When it is determined that there is another digest view 312 to be displayed, or another room in the sub screen zone 310 to display another digest view (NO in step S418), the process returns to step S408 and repeats steps S408 to 5418.

When it is determined that every digest view 312 is being displayed, or there are no rooms to display digest views 312 any more (YES in step S418), it is determined in step S420 whether the user is selecting one of the digest views 312 displayed on the sub screen zone 310, in step S420.

When it is determined that the user is selecting one of the digest views 312 displayed on the sub screen zone 310 by depressing the enter keypad 356 (YES in step S420), the program selector 256 selects a program corresponding to the user-selected digest view so that this program is displayed on the main screen zone 300, instead of the moving picture 302, in step S422.

Not only the sequence shown in FIG. 9, steps S400 and S402 for acquiring the digest views may be executed in a manner of multitasking with step S406 and the succeeding steps.

In FIG. 9, the digest-view display permission determination procedure is performed when the user operates the remote controller 112 to activate the sub screen zone 310 (YES in step S406). However, the determination procedure may be performed at the moment in which each digest image finishes, at regular intervals, etc.

The digest-view display timing control in the program display method described above achieves display of digest views only for programs valuable for users to watch, in view of the program remaining time, thus achieving a higher level of user satisfaction.

It is further understood by those skilled in the art that the foregoing descriptions are preferred embodiments of the disclosed apparatus and method and that various changes and modifications may be made in the invention without departing from the spirit of and scope thereof.

For example, the steps in the program display method may not be executed sequentially as shown in FIG. 9 but may be executed in parallel for some steps or with a sub routine.

As described in detail, the present invention achieves display of digest views only for programs valuable for users to watch, in view of the program remaining time, thus achieving a higher level of user satisfaction.

What is claimed is:

1. A program display apparatus comprising:
    a program receiver to receive programs for each of which an ending time has been determined;
    a digest receiver configured to receive digest views corresponding to the programs and receiving-time information for the programs, the receiving-time information including at least the ending time;
    a memory configured to store the received digest views and receiving-time information;
    a displayer to display a moving picture on a main screen zone of a monitor screen and at least one specific digest view corresponding to a specific program viewable at a current time among the digest views that have been stored in the memory on a sub screen zone of the monitor screen, as being superposed on the moving picture; and
    a display limiter configured to receive the receiving-time information for the specific program viewable at the current time, acquire the ending time of the specific program from the receiving-time information, and calculate a remaining viewable time of the specific program based on the current time and the ending of the specific program to allow the specific digest view corresponding to the specific program to be displayed on the sub screen zone when the remaining viewable time is longer than a reference time, whereas inhibit the specific digest view from being displayed on the sub screen zone when the remaining viewable time is equal to or shorter than the reference time.

2. The program display apparatus according to claim 1, wherein the display limiter compares the remaining viewable time and the reference time to determine whether the remaining viewable time is equal to or shorter than the reference time when the displayer displays the specific digest view on the sub screen zone.

3. The program display apparatus according to claim 1, wherein the displayer repeatedly reproduces and displays the specific digest view that is a moving picture of a certain duration, wherein the display limiter compares the remaining viewable time and the reference time to determine whether the remaining viewable time is equal to or shorter than the reference time at a moment of every completion of reproduction of the specific digest view.

4. The program display apparatus according to claim 1, wherein the display limiter always calculates the remaining viewable time and inhibits the specific digest view from being displayed on the sub screen zone whenever it is determined that the remaining viewable time is equal to or shorter than the reference time.

5. The program display apparatus according to claim 1, wherein the displayer repeatedly reproduces and displays the specific digest view that is a moving picture of a certain duration, wherein the display limiter allows the specific digest view to be displayed until the duration is over when a remaining time of the duration is shorter than the reference time even if the remaining viewable time of the program is equal to or shorter than the reference time.

6. The program display apparatus according to claim 1 further comprising a program selector configured to select and display a particular program among the programs on the main screen zone, instead of the moving picture, when a particular digest view corresponding to the particular program is selected among the digest views and then decided as a program-determination view for use in final determination of a program to be displayed on the main screen zone.

7. The program display apparatus according to claim 1, wherein the reference time is set by a user.

8. The program display apparatus according to claim 1, wherein the reference time is set to have a specific ratio to a total receiving time of the specific program viewable at the current time.

9. A program display apparatus comprising:
    a program receiver to receive programs for each of which a receiving time has been determined;
    a digest receiver to receive digest views corresponding to the programs and receiving-time information for the programs;
    a memory to store the received digest views and receiving-time information;
    a displayer to display a moving picture on a main screen zone of a monitor screen and the digest views that have been stored in the memory on a sub screen zone of the monitor screen, as being superposed on the moving picture;
    a display limiter to allow each digest view to be displayed on the sub screen zone when a remaining time of the program corresponding the digest view, obtained based on the receiving-time information, is longer than a reference time, whereas inhibit the digest view from being displayed on the sub screen zone when the remaining time is equal to or shorter than the reference time;
    a program selector to select and display a particular program among the programs on the main screen zone, instead of the moving picture, when a particular digest view corresponding to the particular program is selected among the digest views and then decided as a program-determination view for use in final determination of a program to be displayed on the main screen zone; and
    an audio output unit configured to output audio corresponding to the particular digest view, instead of audio corresponding to the moving picture displayed on the main screen zone, when the particular digest view is selected but not decided yet as the program-determination view.

10. The program display apparatus according to claim 9, wherein the audio output unit outputs the audio corresponding to the moving picture displayed on the main screen zone instead of the audio corresponding to the particular digest view when the display limiter inhibits the particular digest view from being displayed.

11. The program display apparatus according to claim 9, wherein, when the display limiter inhibits the particular digest view from being displayed, the display limiter selects a further digest view among the digest views and the audio output unit outputs audio corresponding to the further digest view.

12. A program display apparatus comprising:
    a program receiver to receive programs for each of which a receiving time has been determined;
    a digest receiver to receive digest views corresponding to the programs and receiving-time information for the programs;

a memory to store the received digest views and receiving-time information;

a displayer to display a moving picture on a main screen zone of a monitor screen and the digest views that have been stored in the memory on a sub screen zone of the monitor screen, as being superposed on the moving picture;

a display limiter to allow each digest view to be displayed on the sub screen zone when a remaining time of the program corresponding the digest view, obtained based on the receiving-time information, is longer than a reference time, whereas inhibit the digest view from being displayed on the sub screen zone when the remaining time is equal to or shorter than the reference time; and a program selector to select and display a particular program among the programs on the main screen zone, instead of the moving picture, when a particular digest view corresponding to the particular program is selected among the digest views and then decided as a program-determination view for use in final determination of a program to be displayed on the main screen zone;

wherein the displayer displays a supplemental digest view instead of the particular digest view, the supplemental digest having different contents from the particular digest view, when the particular digest view is selected but not decided yet as the program-determination view.

13. A program display apparatus comprising:

a program receiver to receive programs for each of which a receiving time has been determined;

a digest receiver to receive digest views corresponding to the programs and receiving-time information for the programs;

a memory to store the received digest views and receiving-time information;

a displayer to display a moving picture on a main screen zone of a monitor screen and the digest views that have been stored in the memory on a sub screen zone of the monitor screen, as being superposed on the moving picture;

a display limiter to allow each digest view to be displayed on the sub screen zone when a remaining time of the program corresponding the digest view, obtained based on the receiving-time information, is longer than a reference time, whereas inhibit the digest view from being displayed on the sub screen zone when the remaining time is equal to or shorter than the reference time; and an information noticer configured to notice inhibition information when any one of the digest views is inhibited from being displayed by the display limiter.

14. A program display method comprising the steps of:

receiving programs for each of which an ending time has been determined;

receiving digest views corresponding to the programs and receiving-time information for the programs, the receiving-time information including at least the ending time;

storing the received digest views and receiving-time information in a memory;

displaying a moving picture on a main screen zone of a monitor screen and at least one specific digest view corresponding to a specific program viewable at a current time among the digest views that have been stored in the memory on a sub screen zone of the monitor screen, as being superposed on the moving picture;

receiving the receiving-time information for the specific program viewable at the current time;

acquiring the ending time of the specific program from the receiving-time information;

calculating a remaining viewable time of the specific program based on the current time and the ending time of the specific program; and allowing the specific digest view to be displayed on the sub screen zone when the remaining viewable time is longer than a reference time, whereas inhibiting the specific digest view from being displayed on the sub screen zone when the remaining viewable time is equal to or shorter than the reference time.

15. The program display method according to claim 14 further comprising the step of comparing the remaining viewable time and the reference time to determine whether the remaining viewable time is equal to or shorter than the reference time when the specific digest view is displayed on the sub screen zone.

16. The program display method according to claim 14, wherein the display step repeatedly reproduces and displays the specific digest view that is a moving picture of a certain duration, the method further comprises the step of comparing the remaining viewable time and the reference time to determine whether the remaining viewable time is equal to or shorter than the reference time at a moment of every completion of reproduction of the specific digest view.

17. The program display method according to claim 14 further comprising the step of always calculating the remaining viewable time and inhibiting the specific digest view from being displayed on the sub screen zone whenever it is determined that the remaining viewable time is equal to or shorter than the reference time.

18. The program display method according to claim 14 further comprising the step of repeatedly reproducing and displaying the specific digest view that is a moving picture of a certain duration, wherein the allowing step allows the specific digest view to be displayed until the duration is over when a remaining viewable time of the duration is shorter than the reference time even if the remaining time of the program is equal to or shorter than the reference time.

19. The program display method according to claim 14 further comprising the step of selecting and displaying a particular program among the programs on the main screen zone instead of the moving picture, when a particular digest view among the digest views and corresponding to the particular program is selected and then decided as a program-determination view for use in final determination of a program to be displayed on the main screen zone.

20. The program display method according to claim 14, wherein the reference time is set by a user.

21. The program display method according to claim 14, wherein the reference time is set to have a specific ratio to a total receiving time of the specific program viewable at the current time.

* * * * *